(12) United States Patent
Thalanany et al.

(10) Patent No.: US 8,145,210 B2
(45) Date of Patent: Mar. 27, 2012

(54) ENHANCED CROSS-NETWORK HANDOFF FOR MOBILE IP SERVICE MOBILITY

(75) Inventors: Sebastian Thalanany, Kildeer, IL (US); Michael Irizarry, Algonquin, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 855 days.

(21) Appl. No.: 11/618,534

(22) Filed: Dec. 29, 2006

(65) Prior Publication Data

US 2008/0159232 A1 Jul. 3, 2008

(51) Int. Cl.
*H04W 4/00* (2009.01)
(52) U.S. Cl. .................. 455/432.1; 455/422.1; 455/433; 455/435.1; 370/332; 370/331; 370/395.3
(58) Field of Classification Search .................. 370/331, 370/332, 395.21, 395.3, 238; 455/422, 432.1, 455/433, 435.1, 442, 452.1, 452.2, 445
See application file for complete search history.

(56) References Cited

U.S. PATENT DOCUMENTS

| | | | | |
|---|---|---|---|---|
| 2002/0087674 | A1* | 7/2002 | Guilford et al. | 709/223 |
| 2003/0125028 | A1 | 7/2003 | Reynolds | |
| 2004/0192307 | A1* | 9/2004 | Watanabe et al. | 455/436 |
| 2004/0218607 | A1 | 11/2004 | Hurtta et al. | |
| 2004/0223489 | A1 | 11/2004 | Rotsten et al. | |
| 2004/0236547 | A1* | 11/2004 | Rappaport et al. | 703/2 |
| 2004/0246922 | A1 | 12/2004 | Ruan et al. | |
| 2005/0128956 | A1 | 6/2005 | Hsu et al. | |
| 2005/0135310 | A1* | 6/2005 | Cromer et al. | 370/331 |
| 2005/0136928 | A1 | 6/2005 | Zaki | |
| 2006/0019659 | A1* | 1/2006 | Rosenberg et al. | 455/432.1 |
| 2006/0084417 | A1* | 4/2006 | Melpignano et al. | 455/418 |
| 2006/0217111 | A1* | 9/2006 | Marolia et al. | 455/418 |
| 2006/0245392 | A1* | 11/2006 | Buckley et al. | 370/331 |
| 2006/0291419 | A1 | 12/2006 | McConnell et al. | |

OTHER PUBLICATIONS

U.S. Appl. No. 11/324,059, filed Dec. 30, 2005, Thalanany et al.
Granstrom et al. "The Future of Communication Using SIP," *Ericsson Review No. 1* (2002) (8 pages).

(Continued)

*Primary Examiner* — Nick Corsaro
*Assistant Examiner* — Chuong A Ngo
(74) *Attorney, Agent, or Firm* — Leydig, Voit & Mayer, Ltd.

(57) ABSTRACT

A system and method are described whereby an enhanced handoff scheme provides for monitoring of mobile device conditions and network conditions associated with a current access network attachment, as well as with a plurality of access networks on a preferred access network list, to proactively initiate a handoff operation, thereby preserving the QoS constraints necessary for seamless delivery of IP multimedia services. In an embodiment, each of the plurality of access networks is connected to an IMS core network, whereby a policy function receives quality of service constraints associated with the launched application from the mobile device and orders a list of preferred access networks accordingly. Preferably, the policy function selects an appropriate access gateway associated with a target access network based at least in part on the mobile device conditions reported by the mobile device and the access network conditions monitored by the policy function.

24 Claims, 6 Drawing Sheets

OTHER PUBLICATIONS

Gustafson, "Network Design with Mobile IP," Internet Society inet2001 Proceedings, obtained from the internet at http://ftp.isoc.org/inet2001/CD_proceedings/T40/inet_T40.htm on Dec. 4, 2006. (No specified date, but not later than applicant's filing date) (23 pages).

Kavak, "Ericsson's Network-Based IP-VPN Solutions," *Ericsson Review No. 3* (2000) (14 pages).

Kasargod et al. "Packet Data in the Ericsson CDMA2000 Radio Access Network," *Ericsson Review No. 3* (2002) (8 pages).

Langer et al., "CDMA2000—A World View," *Ericsson Review No. 3* (2001) (9 pages).

Handley et al., "SDP: Session Description Protocol," *The Internet Society*, RFC 2327 (Apr. 1998) (40 pages).

Garcia-Martin et al., "Private Header (P-Header) Extensions to the Session Initiation Protocol (SIP) for the 3rd-Generation Partnership Project (3GPP)," *The Internet Society*, RFC 3455 (Jan. 2003) (34 pages).

3rd Generation Partnership Project 2, "IP Network Architecture Model for cdma2000 Spread Spectrum Systems," *3GPP2 S.R0037-0 v3.0* (Aug. 21, 2003) (52 pages).

3rd Generation Partnership Project 2, "All-IP Core Network Multimedia Domain," *3GPP2 X.S0013-002-A v1.0* (Nov. 2005) (179 pages).

Gohring, "Nokia Simplifies Dual-Mode Phones," *IDG News Service* (Oct. 31, 2006), obtained from the Internet at http://www.pcworld.com/article/id,127713-page,1-c,cellphones/article.html (3 pages).

Office Action for U.S. Appl. No. 11/324,059 (U.S. App. Pub. No. 2008-0159232) dated Apr. 8, 2009.

Reply to Office Action of Apr. 8, 2009 for U.S. Appl. No. 11/324,059 (U.S. App. Pub. No. 2008-0159232).

Office Action for U.S. Appl. No. 11/324,059 (U.S. App. Pub. No. 2008-0159232) dated Oct. 29, 2009.

Reply to Office Action of Oct. 29, 2009 for U.S. Appl. No. 11/324,059 (U.S. App. Pub. No. 2008-0159232).

Rosenberg et al., "SIP: Session Initiation Protocol," The Internet Society, RFC 3261 (Jun. 2002) (252- pages).

3rd Generation Partnership Project 2, "All IP Network Architecture Model for cdma 2000 Spread Spectrum Systems," 3GPP2 S.R0037-0 v3,0 (Aug. 21,02003) (52 pages).

Camarillo, G., W. Marshall, and J. Rosenberg, "Integration of Resource Management and Session Initiation Protocol (SIP)," RFC 3312, Oct. 2002 (27 pages).

Office Action for U.S. Appl. No. 11/324,059 (U.S. App. Pub. No. 2008-0159232) dated May 3, 2010.

Reply to Office Action of May 3, 2010 for U.S. Appl. No. 11/324,059 (U.S. App. Pub. No. 2008-0159232), filed Aug. 3, 2010.

Final Office Action for U.S. Appl. No. 11/324,059 (U.S. App. Pub. No. 2008-0159232) dated Sep. 29, 2010.

Interview Summary for U.S. Appl. No. 11/324,059 (U.S. App. Pub. No. 2008-0159232) dated Dec. 22, 2010.

Request for Continued Examination and Reply to Office Action filed Dec. 29, 2010 for U.S. Appl. No. 11/324,059 (U.S. App. Pub. No. 2008-0159232).

Non-Final Office Action for U.S. Appl. No. 11/324,059 (U.S. App. Pub. No. 2008-0159232) dated Feb. 16, 2011.

Reply to Office Action for U.S. Appl. No. 11/324,059 (U.S. App. Pub. No. 2008-0159232), filed May 16, 2011.

* cited by examiner

ENHANCED CROSS-NETWORK HANDOFF FOR MOBILE IP SERVICE MOBILITY

FIELD OF THE INVENTION

This invention relates generally to the field of wireless communications and more specifically to the field of mobile Internet Protocol multimedia services.

REFERENCE TO RELATED APPLICATIONS

This application is related to U.S. application Ser. No. 11/324,059, filed Dec. 30, 2005, which is hereby incorporated by reference in its entirety for everything that it teaches.

BACKGROUND OF THE INVENTION

With an advent of third generation wireless networks, a number of multi-mode mobile devices simultaneously compatible with different network access technologies have entered the marketplace. Typical multi-mode devices are capable of accessing one or more cellular based network access technologies, as well as Wi-Fi based networks that offer reduced mobility but increased throughput within the coverage area. Such devices extend the consumer's ability to access Internet Protocol (IP) based applications that typically require availability of high speed network access in order to satisfy their inherent Quality of Service (QoS) requirements. For example, streaming video and Voice-over-IP (VoIP) applications have strict QoS constraints that necessitate availability of high bandwidth/low latency environments, especially in the face of inherent mobility of wireless users. A typical multi-mode mobile device may be programmed to select a high throughput Wi-Fi network when available and a cellular network when the Wi-Fi connection is not available.

In next generation wireless access networks, the radio network is connected to an access gateway, which serves a mobile device. The access gateway performs the mobility agent function to support the network layer mobility of the mobile device. The handoff of the mobile device is typically triggered by its mobility across serving areas of different access gateways associated with access networks based on either identical or diverse network access technologies. To preserve the user experience across a variety of access networks, the IP multimedia service session must be maintained under mobile conditions, which may necessitate a handoff of the service session between access networks, including a handoff between access networks based on heterogeneous technologies. However, typical handoff schemes between wireless access networks do not take into account the QoS constraints associated with ongoing IP service sessions. The absence of a handoff scheme that preserves the negotiated service-level QoS constraints has an adverse effect on the end-user experience and efficiency of utilization of network resources.

BRIEF SUMMARY OF THE INVENTION

Embodiments of the invention are used to provide an enhanced handoff scheme that utilizes monitoring of mobile device conditions and network conditions associated with a current access network attachment, as well as with at least some of the plurality of access networks on a preferred access network list, to proactively initiate a handoff operation and preserve the QoS constraints necessary for seamless delivery of IP multimedia services. In an embodiment, each of the plurality of access networks is connected to an IP Multimedia (IMS) core network, whereby a policy function (PF) receives quality of service constraints associated with the launched application from the mobile device and orders a list of preferred access networks accordingly. Preferably, the policy function selects an appropriate access gateway associated with a target access network based at least in part on the mobile device conditions reported by the mobile device and the access network conditions monitored by the policy function.

In an embodiment, the mobile device conditions include a Received Signal Quality (RSQ) indicator associated with the current access network and one or more other access networks monitored by the mobile device, as well as battery life status and mobility direction indicators. In one embodiment, the RSQ comprises an indication of Received Signal Strength (RSSI), as well as an indication of Bit-Error Rate (BER) and Signal-to-Noise Ratio (S/N). The network conditions include bandwidth, latency, packet loss, and capacity indicators reported by each of the networks involved in the handoff decision.

In one aspect of the invention, a method is provided for maintaining an IP network session according to quality of service constraints for an application running on a user device, the method comprising receiving a list of preferred access networks for the user device, the list comprising a plurality of access networks authorized for the user device, receiving the quality of service constraints from the user device, establishing the IP network session via a first access network based on the quality of service constraints, wherein the first access network is one of the plurality of networks, monitoring user device and access network conditions for the first access network and at least some of the plurality of networks on the list of preferred access networks to determine whether the first access network is able to maintain the IP network session in accordance with the quality of service constraints for the application, and if the first access network is not able to maintain the IP network session in accordance with the quality of service constraints, transferring the IP network session to a second access network selected based on at least one of the user device conditions and the access network conditions.

In another aspect of the invention, a system is provided for maintaining an IP network session according to quality of service constraints for an application running on a user device, the system comprising a policy function server having a list of preferred access networks for the user device, the list comprising a plurality of access networks authorized for the user device, the user device capable of initiating the IP network session for the application on a first access network according to the quality of service constraints, wherein the policy function server and the user device respectively monitor access network conditions and user device conditions associated with the first access network and at least some of the plurality of networks on the list of preferred access networks, and when the first access network is not able to maintain the IP network session in accordance with the quality of service constraints, the policy function server transferring the IP network session to a second access network selected based on at least one of the user device conditions and the access network conditions.

In still another aspect of the invention, a user device is provided for ruing an application by initiating an IP network session on a first access network according to quality of service constraints for the application, wherein the user device monitors received signal quality associated with one or more access networks and sends at least one handoff parameter to a policy function server when the received signal quality associated with the first access network indicates that the first access network is not able to maintain the IP network session in accordance with the quality of service constraints, and wherein, in response to receiving the at least one handoff parameter, the policy function server transfers the IP network session to a second access network selected based at least in part on the at least one handoff parameter.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
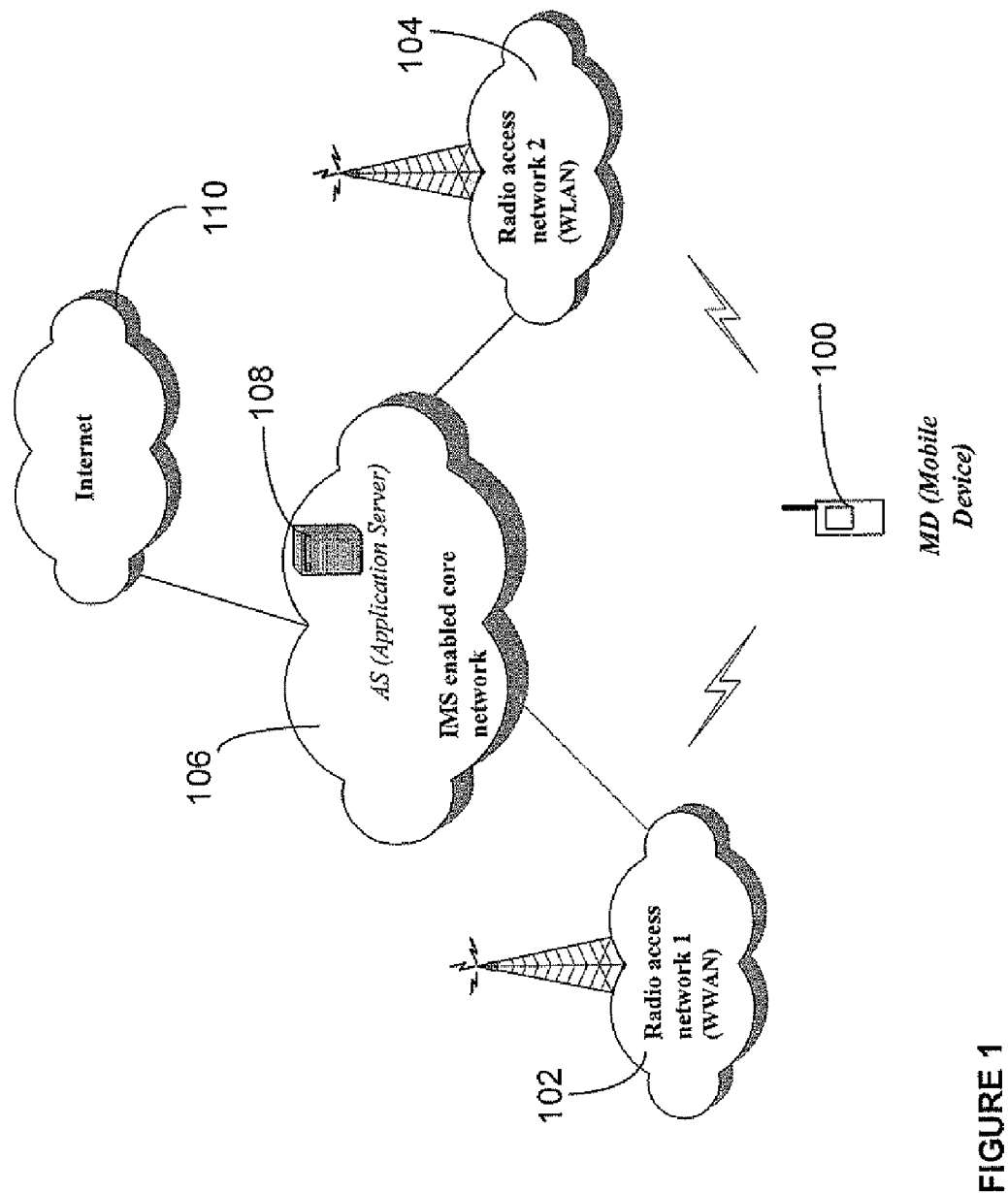
FIG. 1 is a schematic diagram illustrating an IP multimedia network environment, wherein a mobile device communicates with an application server located in an IMS core network via one or more heterogeneous access networks, as contemplated by an embodiment of the present invention.

Turning to FIG. 1, an implementation of a system contemplated by an embodiment of the invention is shown with reference to an IP multimedia network environment. In this embodiment, a user device 100 is a mobile device, such as a wireless telephone or a portable computer capable of wireless communication with a plurality of radio access networks 102, 104. Preferably, the radio access networks 102, 104 use heterogeneous radio access standards to communicate with the user device 100. In the illustrated embodiment, for example, the radio access network 102 is a Wireless Wide Area Access Network (WWAN), such one employing a CDMA-based, GSM-based, or a WCDMA-based standard, while the radio access network 104 is a Wireless Local Area Network (WLAN), such as one employing any of the IEEE 802.11 family of standards known as Wi-Fi. Other embodiments include homogeneous networks 102, 104, that is, those that operate based on the same network access technology.

To enhance the user experience with multimedia based services, the access networks 102, 104 are connected to an IP Multimedia Subsystem (IMS) core network 106 that manages IP network sessions in a mobile environment. The IMS core network 106 further includes an application server (AS) 108, which hosts one or more applications available to the mobile device 100. The applications hosted by AS 108 include multimedia applications, such as streaming media applications, as well as other applications which require the maintenance of specific quality of service (QoS) guarantees. To expand the variety of applications available to the mobile device 100 via the access networks 102, 104, the IMS core network 108 includes a connection to the public Internet 110. Preferably, the mobile device 100 is a multi-mode entity capable of accessing a plurality of access networks operating based on different network technologies. In this embodiment, the mobile device 100 is capable of accessing a WWAN network 102 and a Wi-Fi network 104.

Figure 2:
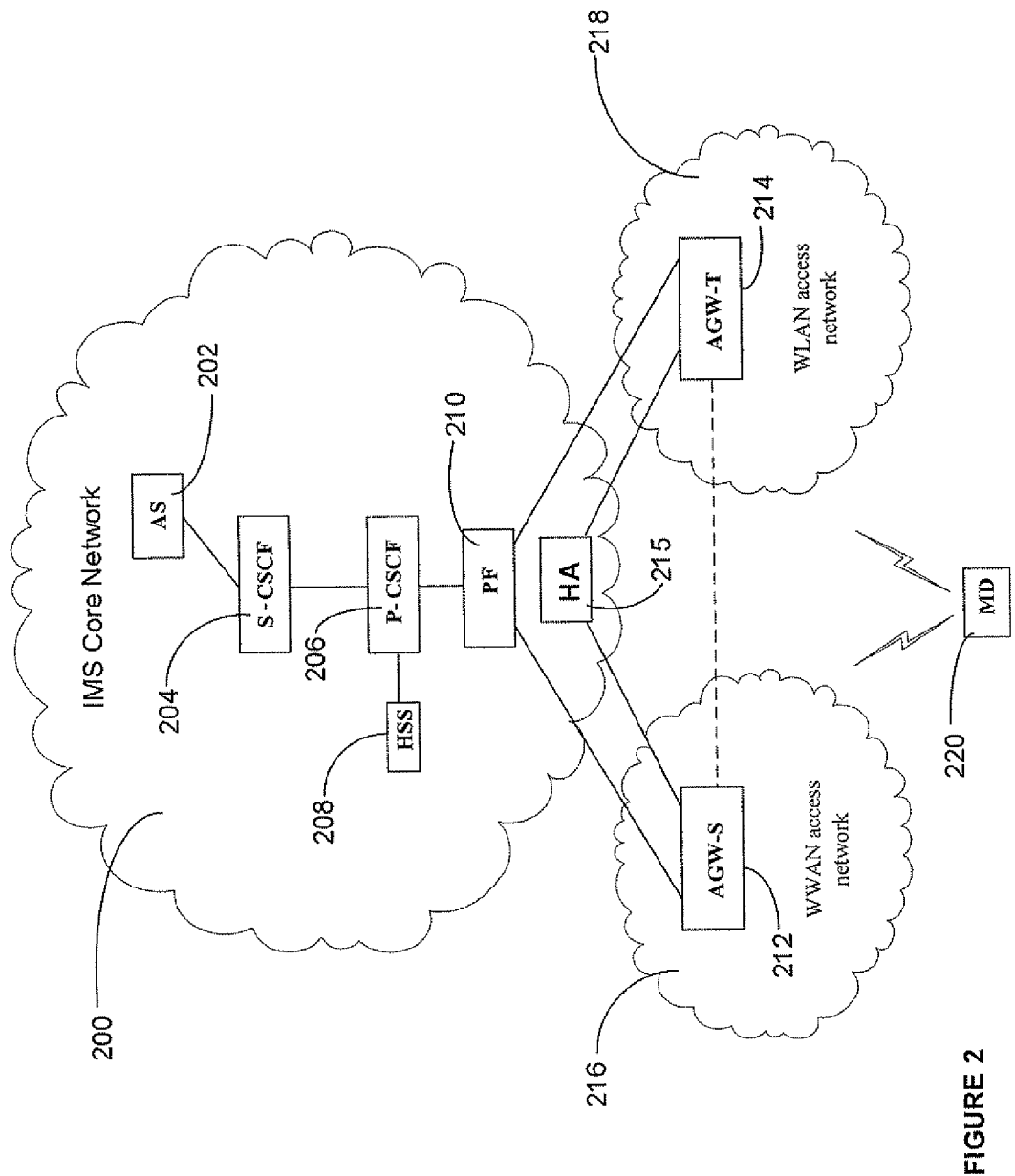
FIG. 2 is a schematic diagram illustrating an implementation of the IMS core network and heterogeneous access networks of FIG. 1 in more detail, in accordance with an embodiment of the invention.

FIG. 2 illustrates an implementation of the IMS core network and heterogeneous access networks of FIG. 1 in more detail. The mobile device 200 and the application server 202 communicate via the access networks 216, 218 and the IMS core network 200 to establish and maintain a service session for an application launched by a user. In addition to the application server 202, the IMS core network 200 includes other IMS functions, such as those described in G. Camarillo, M. Garcia-Martin, "The 3G IP Multimedia Subsystem (IMS) Merging The Internet And The Cellular Worlds," John Wiley & Sons, Ltd., 2006 (second edition), which is incorporated herein by reference in its entirety for everything that it teaches. To this end, the AS 202 is connected to a Serving Call/Session Control Function (S-CSCF) 204, which is a Session Initiation Protocol (SIP) server that performs session control, SIP registrar, authentication, and other IMS functions via SIP protocol signaling described in J. Rosenberg, H. Schulzrinne, G. Camarillo, A. Johnston, J. Peterson, R. Sparks, M. Handley, E. Schooler, "SIP: Session Initiation Protocol," RFC 3261, IETF, June 2002, which is incorporated herein by reference in its entirety for everything that it teaches. The IMS core network 200 includes a number S-CSCFs, wherein each S-CSCF has a certain capacity in terms of a maximum number of supported mobile devices (MD) 220.

The S-CSCF 204, in turn, connects to a Proxy Call/Session Control Function (P-CSCF) 206, which, among other IMS functions, includes user authentication functions and acts as an inbound and outbound SIP proxy server by relaying the SIP requests and responses to and from the mobile device 220 and to and from the IMS core network 200. As with the S-CSCF 204, the IMS core network 200 includes a number of P-CSCFs, wherein each P-CSCF has a certain capacity of being able to support a predefined number of mobile devices 220. The Home Subscriber Server (HSS) 208 is a database of user-related information and contains user subscription data necessary for authentication and authorization of an IP multimedia session associated with a given application. The user subscription data is contained in a user profile that indicates, among other things, the types of services to which the user subscribes. Additionally, a Policy Function (PF) 210 is used to authorize the media plane resources and supervise the QoS over the media plane by interfacing with a plurality of Access Gateways 212, 214, which, in turn, allocate the access network resources within the corresponding heterogeneous networks 216, 218 in accordance with the QoS constraints required by the multimedia application. Finally, the Home Agent (HA) 215 is a router typically involved in the Mobile IP (MIP) session registration process, as well as in tunneling of packets when the MD 220 is roaming.

Figure 3:
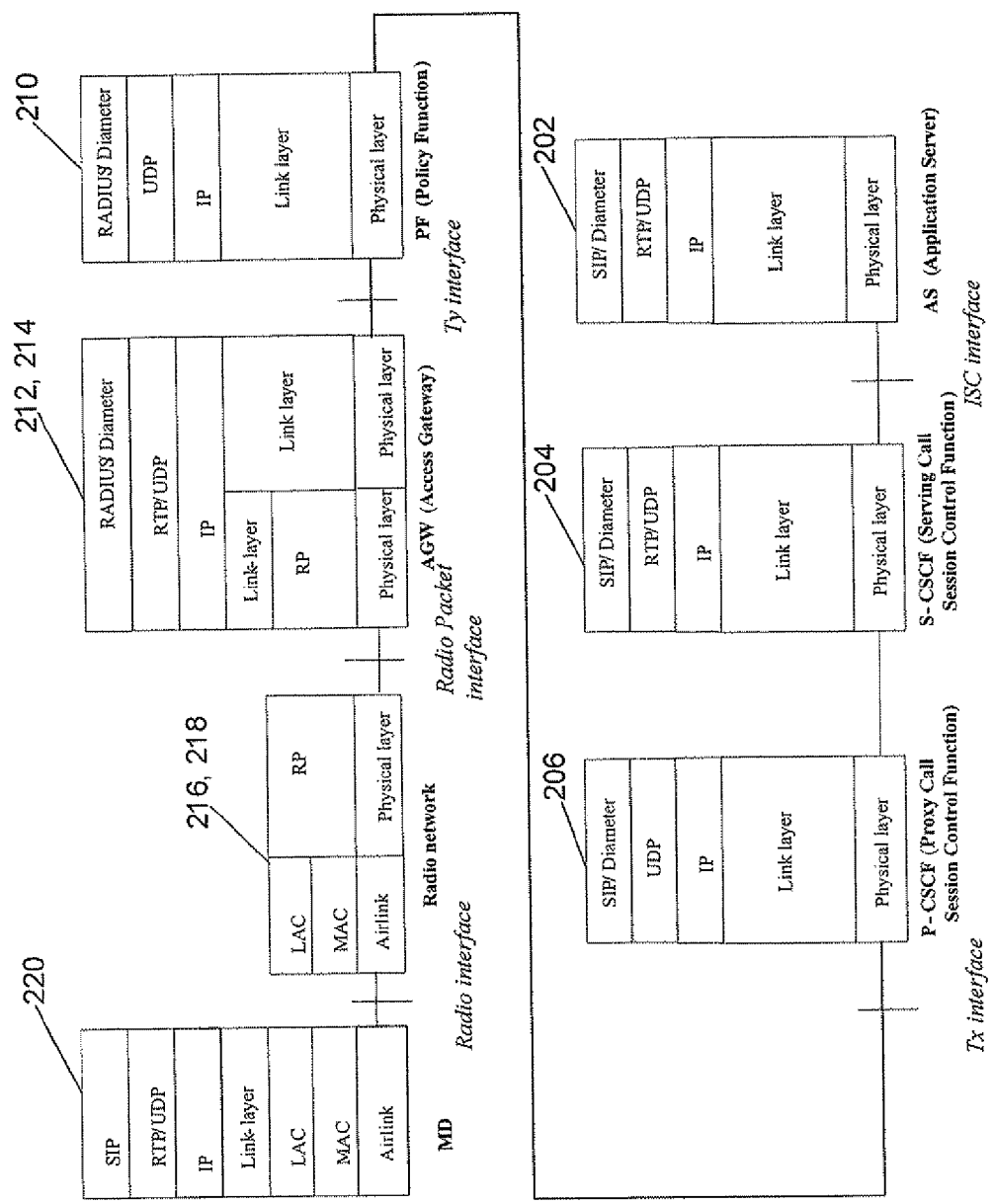
FIG. 3 is a schematic diagram illustrating a protocol reference model for a heterogeneous wireless access network environment associated with the IMS core network entities of FIG. 2, in accordance with an embodiment of the invention.

FIG. 3 illustrates a protocol reference model for a heterogeneous wireless mobile access network environment, including the IMS core network entities described above in connection with FIG. 2. When the networks 216, 218 are based on different wireless network access technologies, the corresponding physical layer and link layer protocols are different. However, for interoperability, the protocols at the network layer and above are based on open standards. In this embodiment, the application control is performed via the SIP protocol and the application media streams are conveyed over RTP/UDP and IP protocols.

Referring to FIGS. 2 and 3, the enhanced handoff scheme utilizes monitoring of mobile device conditions and network conditions, associated with the networks 216, 218 and mobile device 220, to proactively initiate a handoff operation, thereby preserving the QoS constraints necessary for seamless delivery of IP multimedia services. The mobile device conditions include a Received Signal Quality (RSQ) indicator associated with each of the access networks 216, 218 monitored by the mobile device 220, as well as battery life status and mobility direction of the mobile device. In one embodiment, the RSQ comprises an indication of Received Signal Strength (RSSI) of each of the networks 216, 218, as perceived by the mobile device 220, as well as an indication of Bit-Error Rate (BER) and Signal-to-Noise Ratio (S/N) associated with each network 216, 218. The mobility direction indicates the type of access networks that are involved in the impending handoff of the IP network session, such as whether the impending handoff is from a WLAN network access attachment to a WWAN network access attachment or vice-versa. This factor is indicative of potential latency requirements of the access networks involved in the handoff decision, since WLAN networks typically requires lower latencies due to a limited coverage area, as opposed to a WWAN network access environment. The network conditions include bandwidth, latency, packet loss, and capacity indicators reported by each of the networks that are involved in a handoff decision. The access network entity involved in the handoff of the IP network session associated with the mobile IP application is the access gateway. For example, pursuant to a handoff decision described in more detail below in connection with FIGS. 4-6, the network session may be transferred from the source access gateway (AGW-S) 212 to the target access gateway (AGW-T) 214.

Figure 4:
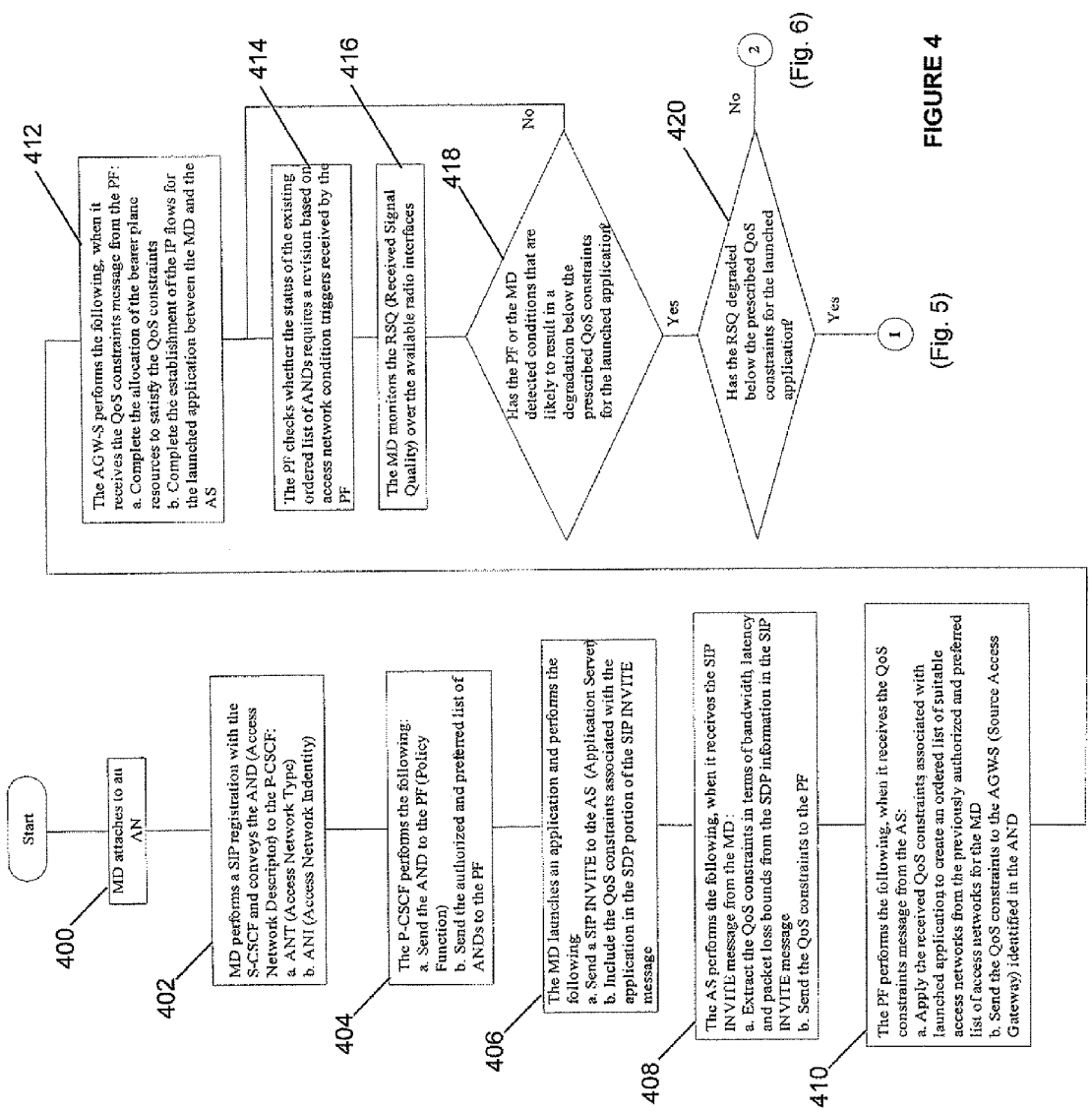
FIGS. 4-6 are flowcharts illustrating an embodiment of an enhanced handoff method for achieving seamless delivery of multimedia services by maintaining QoS constraints associated with an application running on a user device.
Figure 5:
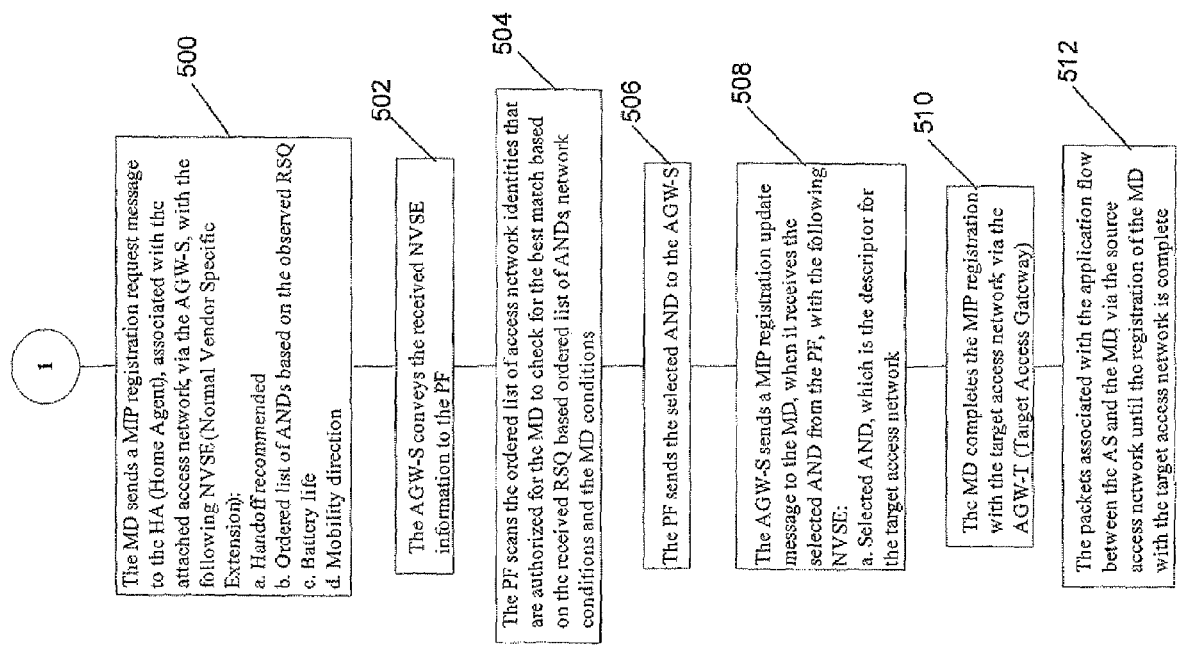
Figure 6:
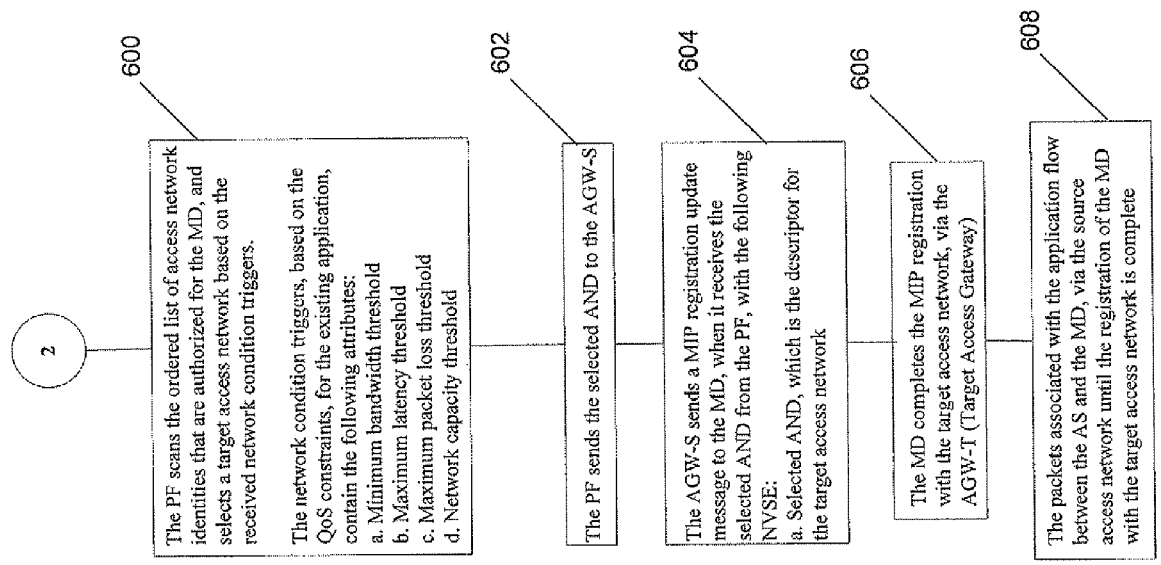

Turning to FIGS. 4-6, an enhanced handoff method is shown for achieving seamless delivery of multimedia services by maintaining QoS constraints associated with an application running on a user device 220. Referring to FIG. 4, upon power-up, in step 400, the mobile device 220 chooses the initial access network attachment 216. The mobile device 220 makes this choice according to the best available RSQ among the access networks selected based on a user profile stored in the MD 220. It should be noted that within the IMS messaging infrastructure, each access network is described in terms of a unique Access Network Descriptor (AND), which, in turn, includes the Access Network Type (ANT) and the Access Network Identity (ANI) descriptors. The ANI identifies the access gateway associated with a particular access network. Correspondingly, the PF 210 in the IMS core network 200 includes a list of ANDs associated with the neighboring and overlaid access networks that are available to the MD 220 for service initiation or potential handoff. The neighboring and overlaid access networks comprise a mix of homogeneous and heterogeneous network access technologies.

Next, in step 402, the MD 220 performs a SIP protocol registration with the S-CSCF 204 and conveys the AND descriptor associated with the current access network 216 to the P-CSCF 206. Specifically, the P-CSCF 206 obtains the AND information from the P-Access-Network-Info field of the SIP REGISTER message communicated during the SIP protocol registration process. When the P-CSCF 206 authenticates the MD 220, it obtains a list of preferred access networks from the HSS 208 user profile that corresponds to the MD 220. Therefore, in step 404, the P-CSCF 206 forwards the information identifying the current access network in the form of the AND identifier, as well as the preferred list of access networks, to the Policy Function 210. In step 406, when the mobile device 220 launches an application hosted by the Application Server 202, it sends a SIP INVITE message to the AS 202. In this embodiment, the Session Description Protocol (SDP) portion of the SIP INVITE message includes the QoS constraints required by the launched application. The QoS constraints are defined by a particular application and vary for different application types. In step 408, the AS 202 extracts the QoS constraints, in terms of the bandwidth, latency, and packet loss bounds, from the SDP portion of the SIP INVITE message transmitted by the mobile device 220 and forwards the QoS constraints to the Packet Function 210. In step 410, the PF 210 uses the QoS constraints supplied by the mobile device 220 to sort the list of preferred access networks by ordering the access networks according to each network's ability to satisfy the QoS constraints for the launched application. To allocate the necessary network resources and provide for policy enforcement in accordance with the applications' QoS constraints, the PF 210 relays them to the source access gateway 212 of the current access network, which is identified by the AND identifier. In step 412, the AGW-S 212, in turn, completes the allocation of the bearer plane resources in accordance with the QoS constraints and establishes the necessary IP flows between the mobile device 220 and the AS 202.

Preferably, in step 414, the Policy Function 210 monitors the network conditions associated with each of the networks on the ordered list, including those associated with the current access network. To reflect the changing network conditions, the PF 210 updates the ordering of the list according to those access networks that are best capable of meeting the desired QoS constraints based on received network condition triggers. The network condition triggers are based on the QoS constraints and include minimum bandwidth, maximum latency, maximum packet loss, and network capacity thresholds, In an embodiment, the minimum bandwidth threshold includes minimum uplink and downlink data rates for a given access technology, such as approximately 2.0 MBps for a WiMAX access network. Embodiments of the maximum latency threshold, in turn, include a value for maximum round-trip delay, such as 200 ms or less required by VoIP services, for example. Further, embodiments of the maximum packet loss threshold include a maximum rate of lost packets expressed as a percentage or ratio, such as less than 0.1%. Finally, embodiments of the network capacity threshold are expressed as the number of packet data sessions supported by a given access gateway, such as 100,000 sessions, for example.

Similarly, in step 416, the MD 220 monitors the mobile device conditions, including the Received Signal Quality, associated with each of the compatible access networks in its vicinity, including the current access network attachment. In other embodiments, the MD 220 monitors all access networks on the preferred access network list. For example, at a given point in time, the MD 220 may observe the WLAN access network 218 at a relatively low, e.g., −86 dBm, signal level (RSSI), but with a low associated BER, while receiving a stronger, e.g., −75 dBm, signal from a WWAN network 216, albeit with a high BER. These readings indicate to the MD 220 that the network 216 is subject to interference that may negatively impact the QoS constraints in spite of the strong associated signal level. Therefore, both PF 210 and MD 220 respectively monitor the network conditions and the mobile device conditions to ensure that the IP multimedia network session associated with the current application meets the specified QoS constraints, step 418. Thus, in step 420, if the MD 220 detects a degradation in the current access network's RSQ parameters that negatively impact the prescribed QoS, the MD 220 initiates a series of steps, described in more detail in connection with FIG. 5 below, resulting in a handoff or transfer of the IP multimedia network session to a suitable access network. If the mobile conditions observed by the MD 220 are not likely to degrade the prescribed QoS, but the PF 210 detects a degradation in current access network's network conditions, the PF 210 likewise initiates steps, outlined in more detail in connection with FIG. 6 below, that result in the transfer of the IP multimedia network session to a suitable access network.

In an embodiment illustrated in FIG. 5, in step 500, when the mobile conditions monitored by the MD 220 indicate that the current access network 216 is not likely to maintain the IP multimedia network session in accordance with the QoS constraints of the application, the MD 220 forwards a Mobile IP (MIP) Registration Request message to the Home Agent 215 associated with the attached access network 216 via the source access gateway 212. Preferably, the MD 220 sorts or orders a list of monitored access networks by their respective Received Signal Quality parameters and includes the RSQ-ordered list in the MIP Registration Request message. In an embodiment, the MIP Registration Message includes mobile device conditions in a Normal Vendor Specific Extension (NVSE) comprising (a) a handoff recommended indicator, (b) an RSQ-ordered list of monitored access networks and associated ANDs, (c) mobile device's battery life status, and (d) mobility direction for the impending handoff. The battery status information, for example, is used in the handoff decision to indicate a preference for the target access network in terms of required power consumption by the MD 220, such as whether the target network should be a WWAN or a WLAN type, where the former includes power control features that result in lower power consumption requirements by a user device. In step 502, the AGW-S 212 receives the NVSE information from the MD 220 and conveys it to the PF 210.

In step 504, the Policy Function 210 correlates the mobile conditions received from the MD 220 with the network conditions monitored by the PF 210 to select the target access network identified via an AND descriptor and a corresponding target access gateway 214. Specifically, the PF 210 correlates the RSQ-ordered list of access networks received from the MD 220 with the QoS-ordered list of monitored access networks (see step 410), taking into account received battery life indicator and mobility information. Therefore the PF 210 takes into account both mobile conditions and network conditions to select the appropriate access network for the handoff operation. In step, 506, the PF 210 sends the selected AND descriptor identifying the selected access network to the source access gateway (AGW-S 212).

Next, in steps 508-512, the MD 220 completes the transfer of the UP network session associated with the launched application to the target access network 218. Specifically, in step 508, in response to receiving the selected AND descriptor from the PF 210, the AGW-S 212 sends a MIP Registration Update message to the MD 220. In an embodiment, the MIP Registration Update message includes an NVSE extension comprising the AND descriptor and the associated target access gateway (AGW-T 214) of the selected access network 218, thereby allowing the MD 220 to complete the MIP registration with the target access network 218 via the target access gateway 214 in step 510. It should be noted that during the handoff completion in steps 508-510, the packets associated with the application continue to flow between the mobile device 220 and the application server 202 via the source access gateway 212 until the MD 220 completes the MIP registration with the selected access network 218 via the target access gateway 214. Upon completion of the MIP registration with the target access network 218, mobile device's attachment to the AGW-S 212 is released and the packets associated with the application flow between the mobile device 220 and the AS 202 via the target access gateway 214.

Turning to FIG. 6, when the mobile conditions observed by the MD 220 are not likely to degrade the prescribed QoS, but the PF 210 detects a degradation in current access network's network conditions, the PF 210 initiates a number of steps that similarly result in the handoff of the current IP multimedia network session to a suitable access network. In the illustrated embodiment, in step 600, when the PF 210 receives a plurality of network condition triggers that indicate that the current network attachment 216 is not likely to maintain the IP multimedia network session in accordance with prescribed QoS constraints, the PF 210 selects a target access network 218 by scanning the QoS-ordered list of access network descriptors (ANDs) for which MD 220 is authorized (see FIG. 4, step 410). The PF 210 selects a target access network having network conditions that match the prescribed QoS constraints necessary for the current application and sends the target network's AND descriptor to the source access gateway (AGW-S 212) in step 602. Subsequently, in steps 604-608, the mobile device 220 changes its access network attachment to the target access network 218 by receiving the selected AND descriptor in an NVSE extension forwarded from the AGW-S 212 (step 604), completing the MIP registration process with the target access network 218 via the AGW-T 214 (step 606), and releasing the attachment to AGW-S 212 when the MIP registration with the target access network 218 is completed (step 608).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for maintaining an IP network session according to quality of service constraints for an application running on a mobile user device, the method comprising:
    receiving a list of preferred access networks for the mobile user device, the list comprising a plurality of access networks authorized for the mobile user device;
    receiving the quality of service constraints from the mobile user device;
    establishing the IP network session via a first access network based on the quality of service constraints, wherein the first access network is one of the plurality of networks;
    monitoring mobile user device conditions for the first access network and at least some of the plurality of networks on the list of preferred access networks to determine whether the first access network is able to maintain the IP network session with the mobile user device in accordance with the quality of service constraints for the application; and
    transferring, when the first access network is not able to maintain the IP network session with the mobile user device in accordance with the quality of service constraints, the IP network session to a second access network, the second access network being selected based at least in part on the mobile user device conditions, the mobile user device conditions including at least one of the group consisting of:
        a mobility direction indicator configured to indicate an access network technology type corresponding to the second access network, and
        a battery consumption indicator configured to indicate a battery life status of the mobile user device to be taken into account with the access network technology type of the second access network for selecting the second access network among the plurality of access networks in the preferred access network list.

2. The method of claim 1 further comprising ordering the list of preferred access networks based on the quality of service constraints.

3. The method of claim 1 further comprising:
    monitoring access network conditions for the first access network and at least some of the plurality of networks on the preferred access network list;
    selecting the second access network among the plurality of access networks in the preferred access network list for transferring the IP network session based on the access network conditions; and
    wherein the access network conditions comprise one or more network condition triggers for each of the plurality of access networks, the network condition triggers associated with the quality of service constraints for the application.

4. The method of claim 3 wherein the network condition triggers include a plurality of thresholds comprising a bandwidth threshold, a latency threshold, a packet loss threshold, and a capacity threshold.

5. The method of claim 1 wherein the mobile user device conditions include a received signal quality indicator.

6. The method of claim 5 further comprising ordering the at least some of the plurality of networks from the list of preferred access networks according to the received signal quality indicator.

7. The method of claim 5 wherein the received signal quality indicator comprises at least one of a received signal strength indicator, a bit error rate indicator, and a signal-to-noise ratio indicator.

8. The method of claim 1 wherein the mobile user device is capable of accessing a cellular network and a Wi-Fi network.

9. The method of claim 1 further comprising controlling the IP network session via an IP Multimedia Subsystem (IMS) core network, wherein each of the plurality of access networks is connected to the IMS core network.

10. A system for maintaining an IP network session according to quality of service constraints for an application running on a mobile user device, the system comprising:
    a policy function server having a list of preferred access networks for the mobile user device, the list comprising a plurality of access networks authorized for the mobile user device;
    the mobile user device capable of initiating the IP network session for the application on a first access network according to the quality of service constraints, wherein the mobile user device monitors mobile user device conditions associated with the first access network and at least some of the plurality of networks on the list of preferred access networks; and
    wherein the policy function server is adapted to transfer the IP network session for the mobile user device to a second access network when the first access network is not able to maintain the IP network session with the mobile user device in accordance with the quality of service constraints, the second access network being selected based at least in part on the mobile user device conditions, the mobile user device conditions including at least one of the group consisting of:
        a mobility direction indicator configured to indicate an access network technology type corresponding to the second access network, and
        a battery consumption indicator configured to indicate a battery life status of the mobile user device to be taken into account with the access network technology type of the second access network for selecting the second access network among the plurality of access networks in the preferred access network list.

11. The system of claim 10 wherein the policy function server orders the list of preferred access networks based on the quality of service constraints.

12. The system of claim 10 wherein the policy function server monitors access network conditions for the first access network and at least some of the plurality of networks on the preferred access network list and selects the second access network among the plurality of access networks in the preferred access network list for transferring the IP network session based on the access network conditions, the access network conditions comprising one or more network condition triggers for each of the plurality of access networks, the network condition triggers associated with the quality of service constraints for the application.

13. The system of claim 12 wherein the network condition triggers include a plurality of thresholds comprising a bandwidth threshold, a latency threshold, a packet loss threshold, and a capacity threshold.

14. The system of claim 10 wherein the mobile user device conditions include a received signal quality indicator.

15. The system of claim 14 wherein the mobile user device orders the at least some of the plurality of networks on the list of preferred access networks according to the received signal quality indicator.

16. The system of claim 14 wherein the received signal quality indicator comprises at least one of a received signal strength indicator, a bit error rate indicator, and a signal-to-noise ratio indicator.

17. The system of claim 10 wherein the mobile user device is capable of accessing a cellular network and a Wi-Fi network.

18. The system of claim 10 further comprising an IP Multimedia Subsystem (IMS) core network for controlling the IP network session, wherein each of the plurality of access networks is connected to the IMS core network.

19. A mobile user device for running an application by initiating an IP network session on a first access network according to quality of service constraints for the application, wherein the mobile user device monitors at least one handoff parameter associated with the first access network and one or more additional access networks and sends the at least one handoff parameter to a policy function server when the first access network is not able to maintain the IP network session with the mobile user device in accordance with the quality of service constraints for the application; and wherein, in response to receiving the at least one handoff parameter, the policy function server transfers the IP network session with the mobile user device to a second access network, the second access network being selected based at least in part on the at least one handoff parameter, the at least one handoff parameter including at least one of the group consisting of:

a mobility direction indicator configured to indicate an access network technology type corresponding to the second access network, and a battery consumption indicator configured to indicate a battery life status of the mobile user device to be taken into account with the access network technology type of the second access network for selecting the second access network.

20. The mobile user device of claim 19 wherein the policy function server includes a list of preferred access networks for the mobile user device, the list ordered based on the quality of service constraints.

21. The mobile user device of claim 20 wherein the policy function selects the second access network based on the at least one handoff parameter and the list of preferred access networks ordered based on the quality of service constraints.

22. The mobile user device of claim 19 wherein the at least one handoff parameter further comprises an ordered list of the one or more additional access networks based on a received signal quality monitored by the mobile user device.

23. The mobile user device of claim 22 wherein the received signal quality comprises at least one of a received signal strength indicator, a bit error rate indicator, and a signal-to-noise ratio indicator.

24. The mobile user device of claim 19 wherein the mobile user device is capable of accessing a cellular network and a Wi-Fi network.

* * * * *